United States Patent
Saulsbury

(10) Patent No.: US 7,489,878 B2
(45) Date of Patent: Feb. 10, 2009

(54) SNOOPING COUNTERMEASURES FOR SYSTEM INDICATORS

(75) Inventor: Ashley Saulsbury, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 595 days.

(21) Appl. No.: 10/834,952

(22) Filed: Apr. 28, 2004

(65) Prior Publication Data

US 2005/0035202 A1 Feb. 17, 2005

Related U.S. Application Data

(60) Provisional application No. 60/495,625, filed on Aug. 14, 2003.

(51) Int. Cl.
*H04B 10/04* (2006.01)
(52) U.S. Cl. .................................................. 398/186
(58) Field of Classification Search ............... 398/171, 398/39–40, 186, 192, 194
See application file for complete search history.

(56) References Cited

U.S. PATENT DOCUMENTS

| 5,032,766 | A | * | 7/1991 | Gundlach et al. ........... 315/150 |
| 6,542,270 | B2 | * | 4/2003 | Perkins et al. .............. 398/140 |
| 7,009,348 | B2 | * | 3/2006 | Mogilner et al. ............ 315/307 |
| 7,095,960 | B2 | * | 8/2006 | Quesenberry et al. ....... 398/115 |
| 7,248,685 | B2 | * | 7/2007 | Martin ................... 379/207.01 |
| 2004/0247121 | A1 | * | 12/2004 | Lee et al. ..................... 380/205 |
| 2005/0019040 | A1 | * | 1/2005 | Trutna, Jr. .................... 398/183 |

OTHER PUBLICATIONS

Damashek, M. "Shift register with feedback generates white noise", Electronics, May 27, 1976, pp. 107, 109 [online]. Retrieved on Dec. 3, 2002. Retrieved from the Internet:<URL:http://www.jmargolin.com/patents/atari3.pdf>.

Loughry, J. and Umphress, D. "Information Leakage from Optical Emanations", ACM Transactions on Information and System Security, vol. 5, No. 3, Aug. 2002, pp. 262-289.

* cited by examiner

*Primary Examiner*—Quan-Zhen Wang
(74) *Attorney, Agent, or Firm*—Gunnison, McKay & Hodgson, L.L.P.

(57) ABSTRACT

A random noise generator is included in the drive circuit supplying power to a system indicator that emits optical signals. The random noise generator generates a random noise signal that is introduced into a signal input to the drive circuit so that data or covert channel information is not recoverable from the optical signals emitted by the system indicator.

18 Claims, 5 Drawing Sheets

SNOOPING COUNTERMEASURES FOR SYSTEM INDICATORS

This application claims the benefit of U.S. Provisional Application No. 60/495,625, filed Aug. 14, 2003.

BACKGROUND OF THE INVENTION

1. Field of the Invention

The present invention is directed to the field of information security, and more particularly, to preventing recovery of data from optical signals emitted by system indicators.

2. Description of Related Art

Information processing systems, such as computer systems used in data processing and networking, frequently utilize system indicators to provide an operator with a visible indication of the status of various components in the system. Light emitting diodes (LEDs) are frequently used as system indicators as they provide a quick visible response to changes in a component's status.

Conventionally, system indicators, such as LEDs, are not connected directly to the component as they would draw too much power from the component. Consequently, power to a system indicator is typically provided by a drive circuit that is part of a drive controller. Generally, the drive controller is coupled to the component and the system indicator, e.g., the LED, and controls the power to the system indicator based on a signal input from the component.

FIG. 1 illustrates a functional diagram of an example of a system 100 including a drive controller 112 having a drive circuit 114 for controlling power to a system indicator 116. In FIG. 1, a data processing component 110 is coupled to drive circuit 114 of drive controller 112 that is further coupled to system indicator 116, such as an LED. Data processing component 110 processes data and this processing generates a signal, such as a voltage signal, which is sent to drive controller 112. Drive circuit 114 receives the signal from data processing component 110 and controls the application of power to system indicator 116 based on the signal.

Intermittent application of power to system indicator 116, e.g., turning system indicator 116 on and off, effects a visible flicker to a viewing operator. The rate of the flickers, termed the flicker rate or frequency, is defined as the number of emission to non-emission transitions per second (Hz), e.g., on/off transitions per second.

Generally, the human eye can discern flicker rates of 50 Hz to 70 Hz or less. Flicker rates greater than 70 Hz, typically, appear as a constant, or steady, emission to a viewing operator, e.g., a constant light emission. In some systems, due to the fast response time of an LED, system indicator 116 can emit modulated optical signals that follow the individual bit transitions of a serial data stream processed by data processing component 110 at flicker rates in excess of 70 Hz.

FIG. 2 illustrates examples of a waveform of a serial data signal 210 and a waveform of a typical LED response signal 212. Referring to FIGS. 1 and 2 together, in FIG. 2, the upper waveform illustrates an example of an EIA/TIA-232-E serial data signal 210 output from data processing component 110, and the lower waveform illustrates the optical response signal 212 of system indicator 116, e.g., an LED response, to serial data signal 210.

In the present example, when no data are being transmitted by data component 110, data component 110 remains in the logical "1" state. The start of a new symbol is indicated by a return to the logical "0" state for one unit interval followed by the serial waveform consisting of a number of data bits, sent least significant bit first. After the last data bit, data component 110 returns to the logical "1" state for a least one unit interval. EIA/TIA-232-E, typically, utilizes a negative voltage to signify a logical "1" and a positive voltage to signify a logical "0".

Conventionally, an LED, such as system indicator 116, is wired to light up for a logical "0" so that system indicator 116 flickers when bits are transmitted, and remains dark when the bits are not transmitted. As long as system indicator 116 is fast enough to closely reproduce the timing of bit transitions, the modulated optical signal emitted from system indicator 116 contains all of the information in serial data signal 210. Even though the resulting output modulated optical signal may exhibit noise or other signal degradation, drive circuit 114 of drive controller 112 and system indicator 116 are generally fast enough to reproduce a modulated optical signal that can be intercepted and analyzed to reproduce serial data signal 210.

In some instances, a system indicator may not have been originally designed to receive signals from a serial data processing component, however, the insertion of a covert channel can establish a direct connection between the system indicator and a serial data processing component. For example, a system could be covertly modified so that a serial data signal is cross-connected to a system indicator, such as an LED, so that the system indicator emits modulated optical signals that can be intercepted and analyzed to recover the serial data signal. In this instance, the covert channel could be designed so that the system indicator emitted modulated optical signals at flicker rates of 70 Hz or higher so as not be discernible to the human eye, e.g., the system indicator appears to emit a constant light, yet detectable by electronic equipment.

In other instances, a system indicator can be used as an indirect covert channel. For example, as earlier described, power to a system indicator can be provided by a drive controller. The drive controller typically receives power from some power source in a system, such as a power supply, and then controls the power to the system indicator, for example, as described with reference to FIG. 1.

In some systems, increasing the load on the system decreases the voltage on the power supply, and the system indicator becomes darker, whereas decreasing the load on the system increases the voltage on the power supply, and the system indicator gets brighter. By writing and installing a program that deterministically changes the load on the system, the brightness of the system indicator can be manipulated to output a data related pattern that can be intercepted and the data recovered from the received pattern, e.g., a covert communication. In this instance, the data may or may not be related to the data processed by the system.

Thus, in some instances, data processed by a data processing component of a system or covert communications can be output as a modulated optical signal from a system indicator. The modulated optical signal can then be intercepted and analyzed to reproduce the data or covert communication.

Interception and recovery of the data, such as by using one or more of a wide variety of interception and spectrum analysis techniques, e.g., snooping techniques, can lead to compromise of the processed data or acquisition of covert communications. Recovery of the processed data or information can lead to compromise of information regarded as confidential by the originator, such as, for example, monetary account information, personal identification information, personal medical information, system security information, and product design information.

Prior art non-hardware related countermeasures proposed to prevent interception of the modulated optical signals included black tape over the LEDs and use of opaque materials on windows to prevent visual access to the LEDs. However, black tape over an LED entirely precludes the use of a system indicator for its intended purpose. Further, opaque materials on windows are not convenient for use with portable equipment and may not be aesthetically acceptable in some environments.

Prior art hardware related countermeasures proposed to prevent interception of the modulated optical signals included pulse stretching hardware modifications utilizing a low pass filter to change the minimum on-time, and or off-time, of an LED indicator to greater than 1.5 times the unit interval of the data rate so that sufficient information could not be recovered to decode the signal. However, even with the pulse stretching hardware modifications, an attacker might be able to time-modulate the asynchronous data stream to effect a covert channel and recover the data from the LED emissions.

SUMMARY OF THE INVENTION

According to the invention, in one embodiment, a random noise generator is included in the drive circuit supplying power to a system indicator that emits optical signals. The random noise generator introduces a random noise signal into a signal input to the drive circuit so that data or covert channel information is not recoverable from the optical signals emitted by the system indicator.

In one embodiment, the random noise generator generates random noise signals at random flicker rates from the lowest to the highest flicker rates an LED can emit optical signals. The random noise signals are introduced into the drive circuit controlling the system indicator and essentially engulf, e.g. mask, data or covert channel signals. Thus, the system indicator still gives an indication of the status of the component, for example, on or off, but data or covert channel information cannot be gleaned from the modulated optical signals emitted by the system indicator.

It is to be understood that both the foregoing general description and following detailed description are intended only to exemplify and explain the invention as claimed.

BRIEF DESCRIPTION OF THE DRAWINGS

The accompanying drawings, which are incorporated in, and constitute a part of this specification, illustrate embodiments of the invention, and together with the description, serve to explain the principles of the invention. In the drawings, the same reference numbers are used to denote similar components in the various embodiments.

In the drawings.

DETAILED DESCRIPTION

The invention will now be described in reference to the accompanying drawings. The same reference numbers may be used throughout the drawings and the following description to refer to the same or like parts.

Figure 3:
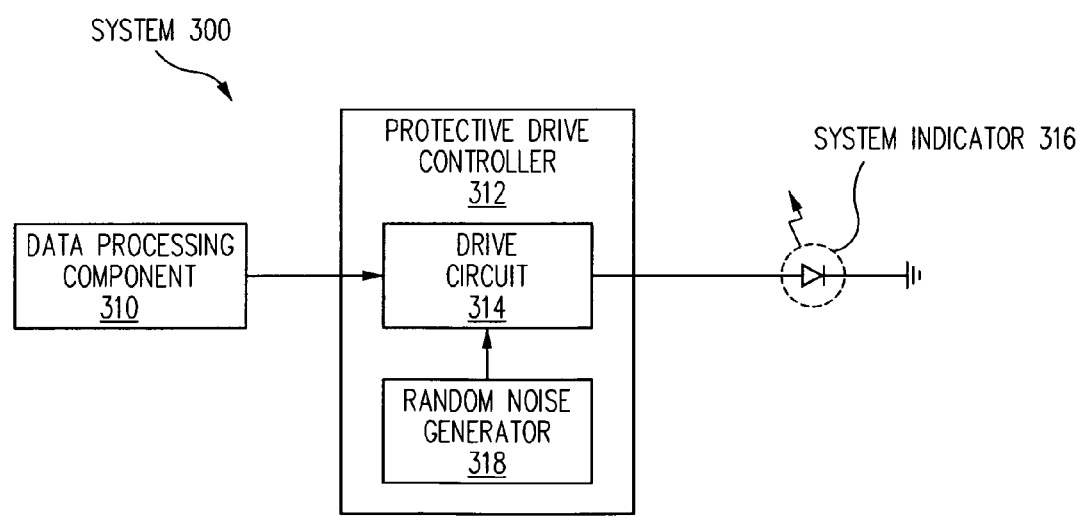
FIG. 3 illustrates a functional diagram of a system having a protective drive controller including a random noise generator in accordance with one embodiment of the invention.

FIG. 3 illustrates a functional diagram of a system 300 including a protective drive controller 312 having a random noise generator 318 in accordance with one embodiment of the invention. In FIG. 3, system 300 can be a stand-alone data processing system or a portion of a larger data processing system. In one embodiment, a data processing component 310 is coupled to a drive circuit 314 of protective drive controller 312, which is further coupled to a system indicator 316, such as an LED.

Data processing component 310 processes data and the processing generates a signal, such as a voltage signal, that is received on drive circuit 314 of protective drive controller 312. A random noise generator 318 coupled to drive circuit 314 generates a random noise signal that is introduced onto drive circuit 314 and modifies the signal received from data processing component 310 to produce a modified signal. Drive circuit 314 controls the application of power to system indicator 316 based upon the modified signal.

In one embodiment, the random noise signal is generated at random flicker rates across the entire frequency spectrum over which system indicator 316 can emit optical signals. The frequency spectrum, in this example, is not the frequency spectrum of the light emitted by the system indicator, but rather the frequency spectrum of the flickers, e.g., flicker rates, from the LED. Thus for example, in one embodiment, random noise generator 318 generates random noise signals at random flicker rates from the lowest to the highest flicker rates an LED can emit optical signals.

Figure 1:
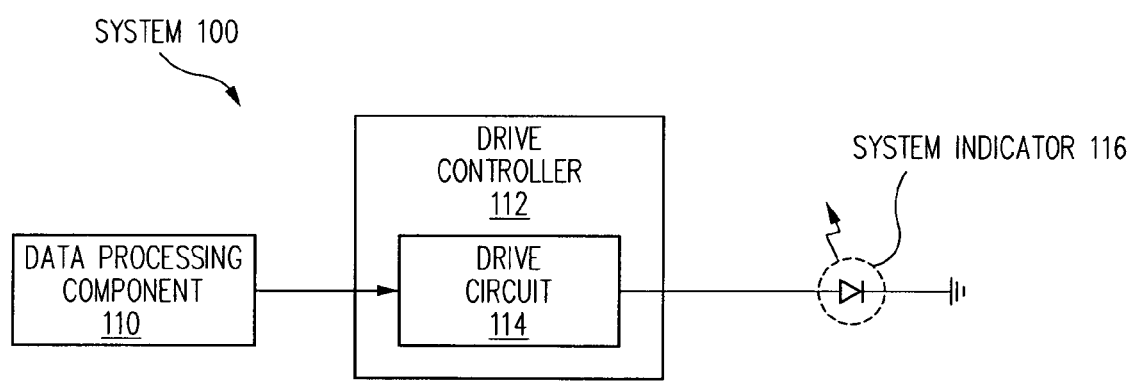
FIG. 1 illustrates a functional diagram of an example of a system including a drive controller for controlling power to a system indicator.
Figure 2:
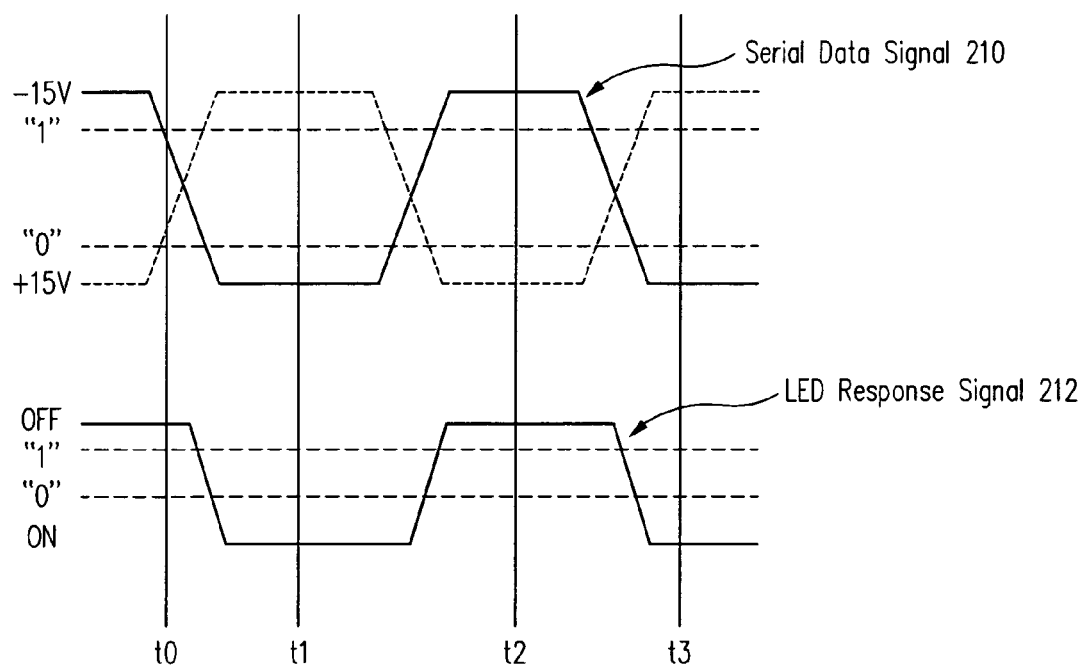
FIG. 2 illustrates examples of a waveform of a serial data signal and a waveform of a typical LED response signal.

In the present embodiment, the random noise signal disrupts, e.g., modifies, the signal from data processing component 310 at random flicker rates. Consequently, the modulated optical signal emitted by system indicator 316 can be intercepted, but the processed data signal is not recoverable due to the introduction of the random noise signal on drive circuit 314. Also, covert channel information, if present, is disrupted, preventing recovery of covert channel communications. Further, implementation of random noise generator 318 in protective drive controller 312 permits simple design implementation by replacing an unprotective drive controller, such as drive controller 112 (FIG. 1), with protective drive controller 312.

Figure 4:
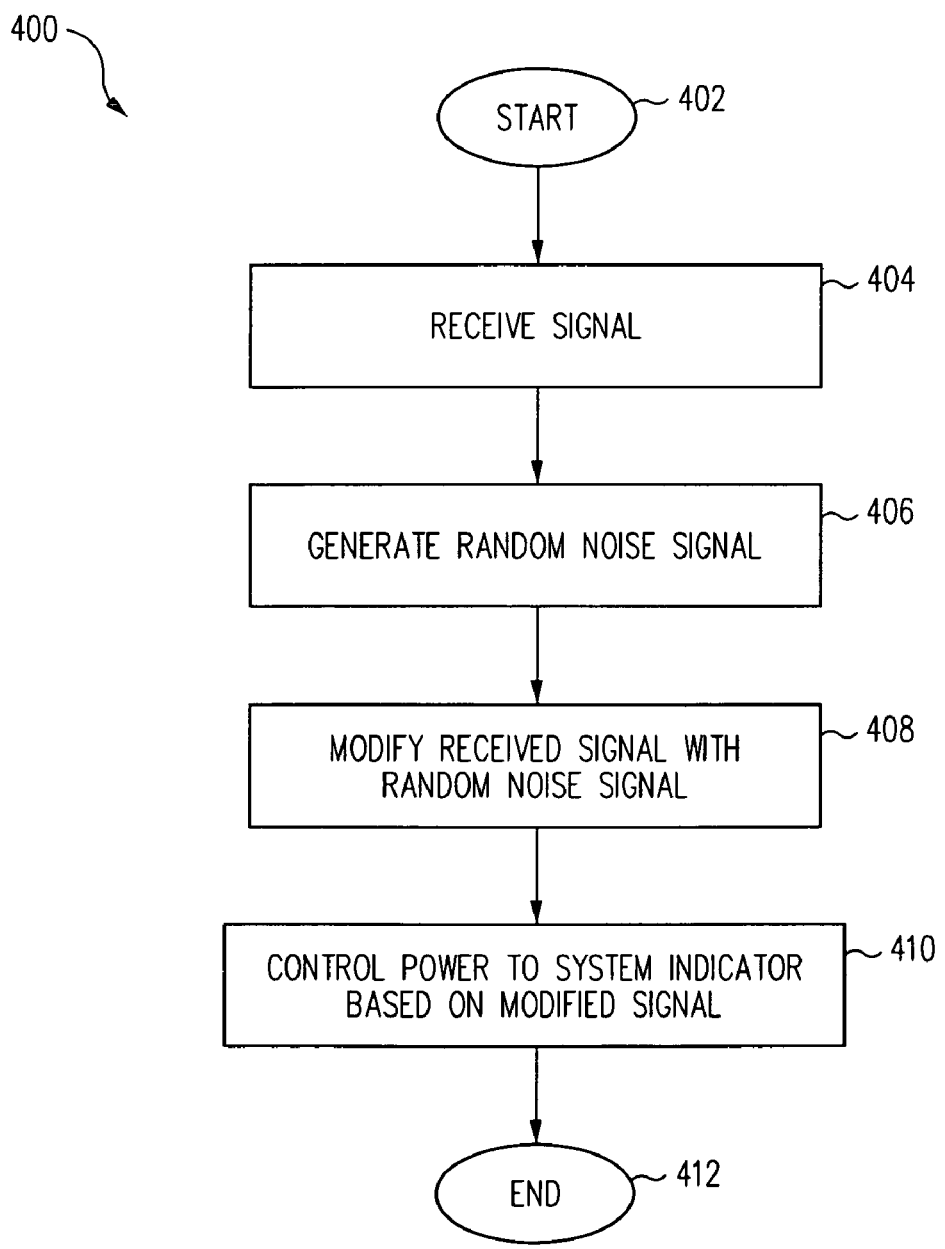
FIG. 4 is a flow diagram of a method for countering snooping of information from a system indicator in accordance with one embodiment of the invention.

FIG. 4 is a flow diagram of a method 400 for countering snooping of information from a system indicator in accordance with one embodiment of the invention. Referring to FIGS. 3 and 4 together, in one embodiment, from an ENTER operation 402, flow moves to a RECEIVE SIGNAL operation 404.

In RECEIVE SIGNAL operation 404, drive circuit 314 of protective drive controller 312 receives a signal from data processing component 310. In one embodiment, the signal contains information that can be recovered from a modulated optical signal emitted by system indicator 116, such as an EIA/TIA-232-E serial data signal or a covert channel communication. From RECEIVE SIGNAL operation 404, flow moves to a GENERATE RANDOM NOISE SIGNAL operation 406.

In GENERATE RANDOM NOISE SIGNAL operation 406, random noise generator 318 of protective drive controller 312 generates a random noise signal. Random noise generator 318 can be one or more of a variety of random noise generators including pseudo-random noise generators. An example of a pseudo-random noise generator is detailed in "Shift Register With Feedback Generates White Noise", Electronics, May 27, 1976, pp. 107 and 109, hereby incorporated in its entirety by reference. Random, and pseudo-random, noise generators are well-known to those of skill in the art and are not further described herein.

In one embodiment, the random noise signal is generated at random flicker rates over the entire frequency spectrum that the LED can emit optical signals in order to mask information that can be gleaned from fluctuations in the modulated optical signal emitted by system indicator 316. From GENERATE RANDOM NOISE SIGNAL operation 406, flow moves to a MODIFY RECEIVED SIGNAL WITH RANDOM NOISE SIGNAL operation 408.

In MODIFY RECEIVED SIGNAL WITH RANDOM NOISE SIGNAL operation 408, the signal received on drive circuit 314 in RECEIVE SIGNAL operation 404 is modified by the random noise signal generated in GENERATE RANDOM NOISE SIGNAL operation 406.

Modification of the received signal with the random noise signal can be accomplished in a variety of ways. In one embodiment, the random noise signal generated by random noise generator 318 is introduced into the signal received from data processing component 310 on drive circuit 314 to produce a modified signal. For example, a random noise signal generated by random noise generator 318, such as the earlier referenced pseudo-random noise generator, can be introduced into the signal received from data processing component 310 on drive circuit 314 to produce a modified signal.

From MODIFY RECEIVED SIGNAL WITH RANDOM NOISE SIGNAL operation 408, flow moves to CONTROL POWER TO SYSTEM INDICATOR BASED ON MODIFIED SIGNAL operation 410.

In CONTROL POWER TO SYSTEM INDICATOR BASED ON MODIFIED SIGNAL operation 410, drive circuit 314 of protective drive controller 312 controls the power to system indicator 316 based on the modified signal. In one embodiment, drive circuit 314 of protective drive controller 312 switches power on or off to system indicator 316 based on the modified signal. Thus, the modified signal no longer tracks the signal received from data processing component 310 as the random noise signal randomly disrupts the signal pattern. Consequently, the modulated optical signal emitted from signal indicator 316 does not enable an interceptor, e.g., a snooper, to recover sufficient information to reproduce the data signal or a covert channel communication.

From CONTROL POWER TO SYSTEM INDICATOR BASED ON MODIFIED SIGNAL operation 410, flow exits process 400 at EXIT operation 412.

Figure 5:
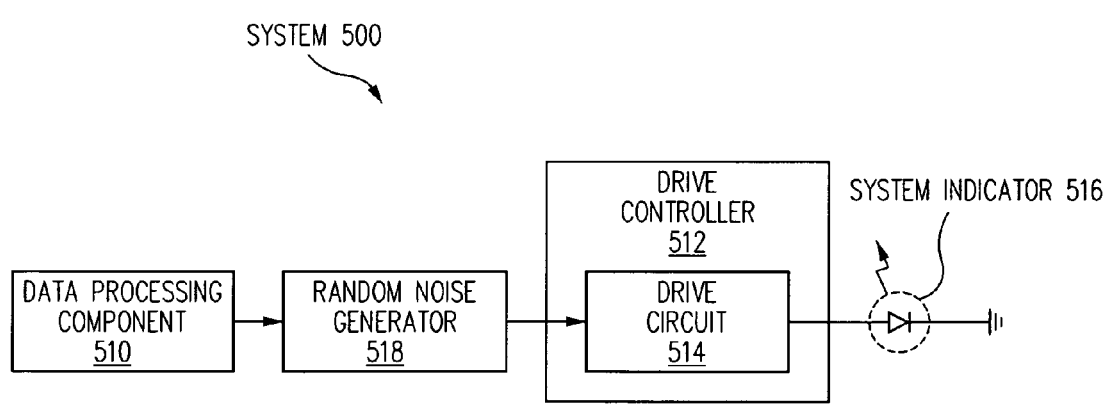
FIG. 5 illustrates a functional diagram of a system including a random noise generator in accordance with another embodiment of the invention.

In other embodiments, it may be desirable to implement random noise generator 318 as a separate component. FIG. 5 illustrates a functional diagram of a system 500 including a random noise generator 518 in accordance with another embodiment of the invention. In FIG. 5, system 500 can be a stand-alone data processing system or part of a larger information processing system. In one embodiment, a data processing component 510 is coupled to random noise generator 518. Random noise generator 518 is coupled to a drive circuit 514 of a drive controller 512, which is further coupled to a system indicator 516, such as an LED.

In the present embodiment, random noise generator 518 is a separate component from drive controller 512 and modifies the signal received from data processing component 510 with a random noise signal prior to receipt by drive circuit 514 of drive controller 512. Drive circuit 514 receives the modified signal and utilizes the modified signal to control power to system indicator 516.

In one embodiment, random noise generator 518 generates the random noise signal at random flicker rates over the entire frequency spectrum that system indicator 516 can emit optical signals.

Thus, as described above, in one embodiment, a random noise generator is included in the drive circuit supplying power to a system indicator. The random noise generator generates random noise signals that are introduced into a signal input to the drive circuit so that data or covert channel information is not recoverable from the modulated optical signals emitted by the system indicator.

In one embodiment, the random noise generator and the drive circuit are part of a protective drive controller providing power to a system indicator. In another embodiment, the random noise generator is inserted between a data processing component and the drive circuit of a drive controller providing power to a system indicator.

By introducing the random noise signal at random flicker rates over the entire frequency spectrum that the system indicator can emit optical signals, data or covert channel information are masked in the random noise signals and are not recoverable from the modulated optical signal emitted by the system indicator.

Additionally, by not sequestering the system indicators from interception by an attacker, interception and analysis of the optical signals can continue, but will not yield useful information, resulting in futile expenditure of resources by an attacker.

The foregoing description of implementations of the invention have been presented for purposes of illustration and description only, and, therefore, are not exhaustive and do not limit the invention to the precise forms disclosed. Modifications and variations are possible in light of the above teachings or can be acquired from practicing the invention. For example, it is not necessary that drive circuit 314 be part of a larger protective drive controller 312, or that drive circuit 514 be part of a larger drive controller 512. Also, in some embodiments, data processing component 310 and 510 can be a component, other than a data processing component.

Further, in other embodiments, the random noise signals can be generated over only a portion or portions of the entire frequency spectrum that can be emitted by the system indicator; however, in these other embodiments, the non-generated portions of the frequency spectrum are left exposed and portions of data or covert channel communications occurring in those areas of the frequency spectrum could be intercepted and recovered.

Consequently, Applicant does not wish to be limited to the specific embodiments shown for illustrative purposes.

What is claimed is:

1. A method comprising:

receiving a signal from a data processing component onto a drive circuit, the drive circuit controlling power to a system indicator, the signal including sufficient information to recover data, the system indicator providing a visible indication of a status of one or more components of the data processing component;

generating a random noise signal, the random noise signal generated at one or more flicker rates over one or more portions of a frequency spectrum that the system indicator can emit optical signals, to prevent emanation of optical signals containing information sufficient to recover the data from the system indicator;

modifying the signal with the random noise signal to produce a modified signal; and controlling the power to the system indicator based on the modified signal to prevent emanation of optical signals from the system indicator containing information sufficient to recover the data such that the data is not recoverable.

2. The method of claim 1, wherein the random noise signal is generated at random flicker rates over the entire frequency spectrum that the system indicator can emit optical signals.

3. The method of claim 1, wherein the random noise signal is generated at random flicker rates within a portion of the frequency spectrum that the system indicator can emit optical signals.

4. The method of claim 1, wherein the random noise signal is generated by a random noise generator.

5. The method of claim 4, wherein the random noise generator is a pseudo-random noise generator.

6. The method of claim 1, wherein the optical signals are modulated optical signals.

7. The method of claim 1, wherein the signal includes sufficient information to recover a covert channel communication, and further wherein modifying the signal with the random noise signal prevents emanation of optical signals from the system indicator containing sufficient information to recover the covert channel communication such that the covert channel communication is not recoverable.

8. The method of claim 1, wherein the random noise signal is generated by a random noise generator, and further wherein, the drive circuit and the random noise generator are part of a protective drive controller.

9. A method comprising:

receiving a signal from a data processing component onto a drive circuit of a protective drive controller, the signal including sufficient information to recover data, the protective drive controller for controlling power to a system indicator, the system indicator providing a visible indication of a status of one or more components of the data processing component, the protective drive controller further including a random noise generator;

generating a random noise signal by the random noise generator, the random noise signal generated at one or more flicker rates over one or more portions of a frequency spectrum that the system indicator can emit optical signals, to prevent emanation of optical signals containing information sufficient to recover the data from the system indicator;

modifying the signal received from the data processing component on the drive circuit with the random noise signal to produce a modified signal; and controlling the power to the system indicator based on the modified signal to prevent emanation of optical signals from the system indicator containing information sufficient to recover the data such that the data is not recoverable.

10. The method of claim 9, wherein the random noise signal is generated at random flicker rates over the entire frequency spectrum that the system indicator can emit the optical signals.

11. The method of claim 9, wherein the optical signals are modulated optical signals.

12. A protective drive controller for controlling power to a system indicator that can emit optical signals, the system indicator providing a visible indication of a status of one or more components of a data processing component, the protective drive controller comprising:

a drive circuit for receiving a signal from the data processing component and for controlling the power to the system indicator, the signal including sufficient information to recover data; and a random noise generator coupled to the drive circuit, the random noise generator for generating a random noise signal for modifying the signal to produce a modified signal, the random noise signal generated at one or more flicker rates over one or more portions of a frequency spectrum that the system indicator can emit optical signals, to prevent emanation of optical signals containing information sufficient to recover the data from the system indicator, wherein the protective drive controller modifies the signal with the random noise signal to produce the modified signal and controls the power to the system indicator based on the modified signal to prevent emanation of optical signals from the system indicator containing information sufficient to recover the data such that the data is not recoverable.

13. The protective drive controller of claim 12, wherein the random noise generator is a pseudo-random noise generator.

14. The protective drive controller of claim 12, wherein the random noise signal is generated at random flicker rates over the entire frequency spectrum that the system indicator can emit the optical signals.

15. A system comprising:

a data processing component for producing a signal, the signal including sufficient information to recover data;

a system indicator for emitting optical signals, the system indicator providing a visible indication of a status of one or more components of the data processing component; and a protective drive controller coupled to the data processing component and the system indicator, the protective drive controller for receiving the signal from the data processing component and for modifying the signal with a random noise signal to produce a modified signal, the random noise signal generated at one or more flicker rates over one or more portions of a frequency spectrum that the system indicator can emit optical signals, to prevent emanation of optical signals containing information sufficient to recover the data from the system indicator, the protective drive controller for controlling power to the system indicator based on the modified signal to prevent emanation of optical signals from the system indicator containing information sufficient to recover the data such that the data is not recoverable.

16. The system of claim 15, wherein the random noise signal is generated at random flicker rates over the entire frequency spectrum that the system indicator can emit the optical signals.

17. A system comprising:

a data processing component for generating a signal, the signal containing sufficient information to recover data;

a system indicator for emitting optical signals, the system indicator providing a visible indication of a status of one or more components of the data processing component;

a drive circuit coupled to the system indicator and to a random noise generator, the drive circuit for controlling power to the system indicator; and a random noise generator coupled to the drive circuit and to the data processing component, the random noise generator for generating random noise signals, the random noise signals generated at one or more flicker rates over one or more portions of a frequency spectrum that the system indicator can emit optical signals, to prevent emanation of optical signals containing information sufficient to recover the data from a the system indicator, wherein the signal is modified with the random noise signals to produce a modified signal, the drive circuit controlling power to the system indicator based on the modified signal to prevent emanation of optical signals from the system indicator containing information sufficient to recover the data such that the data is not recoverable.

18. The system of claim 17, wherein the random noise signal is generated at random flicker rates over the entire frequency spectrum that the system indicator can emit the optical signals.

* * * * *